United States Patent
Eum et al.

(10) Patent No.: US 9,800,136 B2
(45) Date of Patent: Oct. 24, 2017

(54) ACTIVE DAMPER AND POWER SUPPLY INCLUDING THE SAME

(71) Applicant: FAIRCHILD KOREA SEMICONDUCTOR LTD., Bucheon-si (KR)

(72) Inventors: Hyun-Chul Eum, Seoul (KR); Young-Jong Kim, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 65 days.

(21) Appl. No.: 14/527,033

(22) Filed: Oct. 29, 2014

(65) Prior Publication Data

US 2015/0124499 A1    May 7, 2015

(30) Foreign Application Priority Data

Nov. 4, 2013 (KR) .................. 10-2013-0133117
Jun. 5, 2014 (KR) .................. 10-2014-0068600

(51) Int. Cl.
| | |
|---|---|
| G05F 1/569 | (2006.01) |
| G05F 1/00 | (2006.01) |
| H02H 7/122 | (2006.01) |
| H02M 1/32 | (2007.01) |
| H02M 3/335 | (2006.01) |
| H02M 1/34 | (2007.01) |

(52) U.S. Cl.
CPC ............ H02M 1/32 (2013.01); H02M 3/335 (2013.01); *H02M 2001/348* (2013.01)

(58) Field of Classification Search
CPC ...... H02M 2001/0048; H02M 2001/34; G05F 1/569

USPC .......... 323/242, 276, 288, 905, 908; 363/40, 363/56.12
See application file for complete search history.

(56) References Cited

U.S. PATENT DOCUMENTS

| | | | | |
|---|---|---|---|---|
| 6,060,875 A | * | 5/2000 | Capici ............... | H02M 1/15 323/354 |
| 2001/0005322 A1 | * | 6/2001 | Uchida .............. | H02M 1/34 363/97 |
| 2003/0063484 A1 | * | 4/2003 | Carsten ............. | H02M 3/33592 363/127 |
| 2007/0263415 A1 | * | 11/2007 | Jansen .............. | H02M 3/33507 363/21.03 |
| 2009/0257255 A1 | * | 10/2009 | Zhang ............... | H02M 1/34 363/50 |
| 2012/0293085 A1 | * | 11/2012 | Eom ................. | H02M 1/15 315/200 R |
| 2013/0128627 A1 | * | 5/2013 | Moon ............... | H02M 3/33507 363/21.17 |

(Continued)

OTHER PUBLICATIONS

Power Integrations, LNK403-409EG/413-419EG LinkSwitch-PH Family, www.powerint.com, Nov. 2010, 20 pages.

(Continued)

*Primary Examiner* — Adolf Berhane
*Assistant Examiner* — Gary Nash

(57) ABSTRACT

An active damper and a power supply according to exemplary embodiments include: a damper resistor coupled to an input voltage; a damper switch coupled in parallel with the damper resistor; and a capacitor to which a reset current generated by a leading edge of the input voltage flows. The damper switch is turned off by the reset current.

28 Claims, 10 Drawing Sheets

(56) References Cited

U.S. PATENT DOCUMENTS

2013/0343099 A1* 12/2013 Eom ................. H02M 3/33569
　　　　　　　　　　　　　　　　　　　363/21.12
2014/0029313 A1* 1/2014 Telefus ............. H02M 3/33523
　　　　　　　　　　　　　　　　　　　363/21.02

OTHER PUBLICATIONS

NXP Semiconductors, UM10433, SSL2103 dimmable isolated LED driver demo board, Rev. 1-9, Dec. 2010, 29 pages.

* cited by examiner

ACTIVE DAMPER AND POWER SUPPLY INCLUDING THE SAME

CROSS-REFERENCE TO RELATED APPLICATION

This application claims priority to and the benefit of Korean Patent Application No. 10-2013-0133117 filed in the Korean Intellectual Property Office on Nov. 4, 2013 and Korean Patent Application No. 10-2014-0068600 filed in the Korean Intellectual Property Office on Jun. 5, 2014, the entire contents of which are incorporated herein by reference.

BACKGROUND (a) Field

Exemplary embodiments relate to an active damper and a power supply including the same.

(b) Description of the Related Art

A spike current that charges a filter capacitor coupled to a dimmer may be generated due to a leading edge of an input voltage having passed through a dimmer. An overshoot of the spike current may cause damage to the dimmer, and an undershoot of the spike current may cause a malfunction of the dimmer.

A damper resistor is provided to protect the dimmer by reducing the spike current. However, when no spike current is generated by the leading edge of the input voltage, unnecessary power consumption occurs due to the damper resistor. In addition, when no dimmer is provided, the damper resistor causes unnecessary power consumption.

The above information disclosed in this Background section is only for enhancement of understanding of the background of the invention and therefore it may contain information that does not form the prior art that is already known in this country to a person of ordinary skill in the art.

SUMMARY

Exemplary embodiments of the invention provide an active damper that can prevent unnecessary power consumption with a simple structure, and a power supply including the same.

An active damper according to an exemplary embodiment includes: a damper resistor coupled to an input voltage; a damper switch coupled in parallel with the damper resistor; and a capacitor to which a reset current generated by a leading edge of the input voltage flows, and the damper switch is turned off by the reset current.

A charge voltage of the capacitor may follows the input voltage.

A first end of the damper resistor may be coupled to the input voltage, the active damper may further include a Zener diode coupled between a second end of the damper resistor and a gate of the damper switch, and the reset current may flow to the capacitor through the Zener diode.

The first end of the damper resistor is coupled to the input voltage, the active damper further includes a diode coupled between a second end of the damper resistor and a gate of the damper switch, and the reset current may flow to the capacitor through the diode.

The damper switch is a metal oxide semiconductor field effect transistor (MOSFET), and a first electrode of the capacitor and a gate of the damper switch are coupled with each other.

Alternatively, the damper switch is a bipolar junction transistor (BJT), and a first electrode of the capacitor and a base of the damper switch are coupled with each other.

The active damper further includes a turn-on circuit supplying an on-bias current to a node where a first electrode of the capacitor and a control end of the damper switch are coupled.

When the reset current is higher than the on-bias current, the damper switch is turned off.

The active damper further includes a resistor coupled to the capacitor, and the resistor may operate as a damping resistor when the capacitor is charged by the reset current.

A first electrode of the capacitor is coupled to a control end of the damper switch, and the resistor is coupled to a second electrode of the capacitor.

From a time at which the damper switch is turned off by the leading edge to a time at which the damper switch is turned on are determined by the capacitor and the resistor.

A power supply according to an exemplary embodiment includes an active damper coupled to an input voltage, and a power switch electrically coupled to the input voltage passed through the active damper. The active damper includes a damper resistor coupled to the input voltage, a damper switch coupled in parallel with the damper resistor, and a capacitor to which a reset current generated by a leading edge of the input voltage flows, and the damper switch is turned off by the reset current.

The active damper may further include a turn-on circuit supplying an on-bias current to a node where a first electrode of the capacitor and a control end of the damper switch are coupled.

When the reset current is higher than the on-bias current, the damper switch may be turned off.

The turn-on circuit includes: a first resistor including a first end coupled to a transformer of the power supply; a first capacitor including a first electrode coupled to the transformer; and a second resistor including a first end coupled to a second end of the first resistor and a second electrode of the first capacitor and a second end coupled to the control end of the damper switch.

The power supply further includes a bleeder resistor and a bleeder capacitor coupled between the input voltage and a ground, and the capacitor may be the bleeder capacitor.

The active damper further includes a third resistor coupled between a first electrode of the bleeder capacitor and a control end of the damper switch, and the third resistor may operate as a damping resistor when the bleeder capacitor is charged by the reset current.

A charge voltage of the capacitor follows the input voltage.

A first end of the damper resistor is coupled to the input voltage, the active damper further includes a diode coupled between a second end of the damper resistor and a gate of the damper switch, and the reset current may flow to the capacitor through the diode.

An active damper according to an exemplary embodiment of the invention includes: a damper resistor coupled to an input voltage; a damper switch coupled in parallel with the damper resistor; a circuit detecting a voltage of an inductor coupled to a first input voltage through the damper resistor or the damper switch; and a circuit controlling a switching operation of the damper switch using a detection voltage according to the detected inductor voltage.

The detection circuit includes: a diode including an anode coupled to a first end of the inductor; and a first capacitor coupled between a cathode of the diode and the first input voltage, and the detection voltage is a voltage between a first node to which the cathode of the diode and the first capacitor are coupled and a first end of the inductor.

The detection circuit further includes: a first resistor including a first end coupled to a control electrode of the damper switch and a Zener diode coupled between a second end of the first resistor and the first node.

The switch control circuit comprises a second resistor coupled between the first end of the first resistor and the input voltage and a second capacitor coupled between the first end of the first resistor and the input voltage.

A first end of the damper resistor is coupled to the input voltage, and the active damper further includes a Zener diode coupled between a second end of the damper resistor and a gate of the damper switch.

A power supply according to an exemplary embodiment of the invention includes: an active damper coupled to an input voltage; an inductor including a first end coupled to an input voltage passed through the active damper; and a power switch coupled to a second end of the inductor, wherein the active damper comprises: a damper resistor coupled to the input voltage; a damper switch coupled in parallel with the damper resistor; a circuit detecting a voltage of the inductor; and a circuit controlling a switching operation of the damper switch using a detection voltage according to the detected inductor voltage.

The detection circuit includes a diode including an anode coupled to a second end of the inductor and a first capacitor coupled between a cathode of the diode and the first capacitor, and the detection voltage is a voltage between a first node to which the cathode of the diode and the first capacitor are coupled and the second end of the inductor.

The detection circuit further includes a first resistor including a first end coupled to the control electrode of the damper switch and a Zener diode coupled between the second end of the first resistor and the first node.

The switch control circuit includes a second resistor coupled between the first end of the first resistor and the input voltage and a second capacitor coupled between the first end of the first resistor and the input voltage.

A first end of the damper resistor is coupled to the input voltage, and the active damper further includes a Zener diode coupled between a second end of the damper resistor and a gate of the damper switch.

The detection circuit may operate as a snubber circuit of the power supply. The snubber circuit may determine the inductor voltage.

DETAILED DESCRIPTION OF THE EMBODIMENTS

Figure 1:
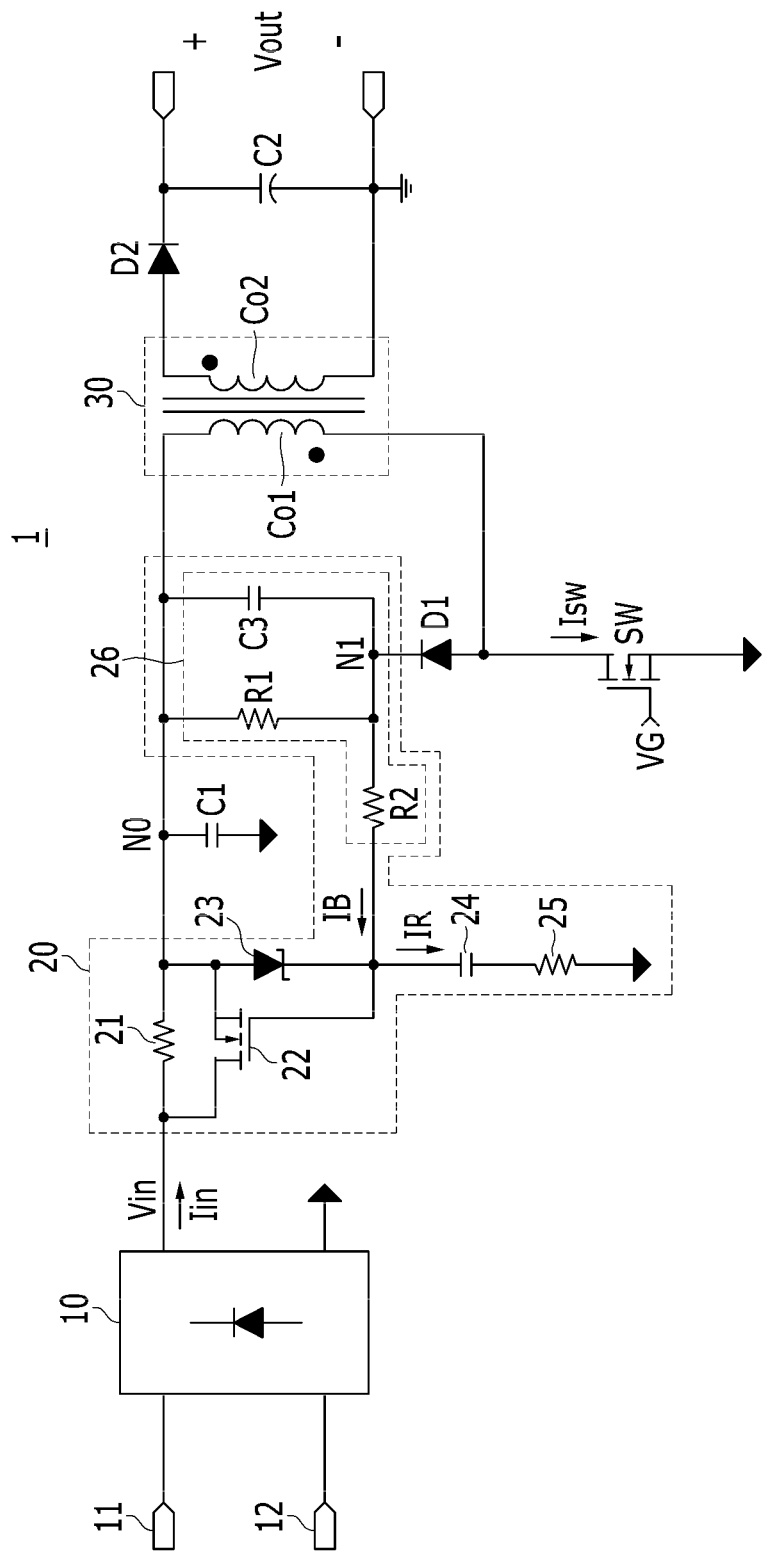
FIG. 1 shows a power supply including an active damper according to an exemplary embodiment.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Hereinafter, exemplary embodiments of the invention will be described with reference to the accompanying drawings.

FIG. 1 shows a power supply including an active damper according to an exemplary embodiment.

The power supply 1 shown in FIG. 1 is realized as a flyback converter, but the invention is not limited thereto.

The power supply 1 includes a rectification circuit 10, an active damper 20, a transformer 30, a filter capacitor C1, a diode D1, an output capacitor C2, a power switch SW, and a rectification diode D2.

The rectification circuit 10 generates an input voltage Vin by rectifying signals input to lateral ends 11 and 12 thereof. The signal input to the lateral ends 11 and 12 may be AC input passed through a dimmer, or AC input not passed through a dimmer when the dimmer is not connected to the lateral ends 11 and 12. The rectification circuit 10 may be a full-bridge diode which is a full-wave rectification circuit. An input current Iin of the power supply 1 is rectified through the rectification circuit 10.

The filter capacitor C1 is connected with the input voltage Vin through the active damper 20 and smoothes the input voltage Vin. The filter capacitor C1 is connected between a node N0 and a primary ground.

The transformer 30 includes a primary wire CO1 connected to the input voltage Vin and a secondary wire CO2 connected to the output voltage Vout. The primary wire CO1 and the secondary wire CO2 are coupled in an insulated manner with a predetermined turn ratio (turns of primary wire CO1:turns of secondary wire CO2).

A first end of the primary wire CO1 is connected to the node N0 and a second end of the primary wire CO1 is connected to a first electrode (i.e., a drain) of the power switch SW. A current flowing during a turn-on period of the power switch SW flows to the primary coil CO1 and thus energy is stored.

A first end of the secondary wire CO2 is connected to an anode of the rectification diode D1 and a second end of the secondary wire CO2 is connected to a secondary ground. During a turn-off period of the power switch SW, energy stored in the primary wire CO1 is transmitted to the secondary wire CO2.

The power switch SW is electrically connected with the input voltage Vin passed through the active damper 20 and controls output power of the power supply 1. A gate voltage VG is input to a gate of the power switch SW and a second electrode (i.e., a source) of the power switch SW is connected to the primary ground. The power switch SW is turned on by a high-level gate voltage VG and turned off by a low-level gate voltage VG.

The output capacitor C2 is connected between lateral output ends of the power supply 1. A first electrode of the output capacitor C2 is connected to a cathode of the rectification diode D2 and a second electrode of the output capacitor C2 is connected to the secondary ground.

An anode of the rectification diode D2 is connected to a first end of the secondary wire CO2. A current flowing to the secondary wire CO2 is rectified through the rectification diode D2 and thus may be supplied to a load (not shown) or may charge the output capacitor C2.

The active damper 20 includes a damper resistor 21, a damper switch 22, a Zener diode 23, a capacitor 24, a resistor 25, and a turn-on circuit 26.

The damper switch 22 is turned off by a reset current IR generated by being synchronized with a leading edge of the input voltage Vin, and when the reset current IR is lower than an on-bias current IB, the damper switch 22 is turned on. The active damper 20 is operated as a resistor during a turn-off period of the damper switch 22. The input voltage Vin and a filter capacitor C1 are directly connected with each other during a turn-on period of the damper switch 22.

The turn-on circuit 26 includes a resistor R1, a capacitor C3, and a resistor R2, and generates the on-bias current IB. The resistor R1, the capacitor C3, and the diode D1 form a snubber circuit. In the exemplary embodiment of FIG. 1, the resistor R1 and the capacitor C3 operate as a circuit that turns on the damper switch 22, together with the resistor R2.

A current that can charge the capacitor C3 is generated through the diode D1 during the turn-off period of the power switch SW, and a voltage of a node N1 is high enough to turn on the damper switch 22. The on-bias current IB supplied from the capacitor C3 flows to a gate of the damper switch 22 through the resistor R2 so that a gate-source voltage of the damper switch 22 is maintained with an on-level.

An anode of the diode D1 is connected to the first electrode (i.e., drain) of the power switch SW and a cathode of the diode D1 is connected to the node N1.

The resistor R1 and the capacitor C3 are connected between the node N1 and the node N0, and the resistor R2 is connected between the node N1 and the gate of the damper switch 22.

The damper resistor 21 and the damper switch 22 are connected in parallel with each other. The damper resistor 21 is connected between the input voltage Vin and the node N0, a drain of the damper switch 22 is connected to the input voltage Vin, and a source of the damper switch 22 is connected to the node N0.

An anode of the Zener diode 23 is connected to the node N0 and a cathode of the Zener diode 23 is connected to the gate of the damper switch 22. A first electrode of the capacitor 24 is connected to a control end (hereinafter a gate) of the damper switch 22, a second electrode of the capacitor 24 is connected to a first end of the resistor 25, and a second end of the resistor R25 is connected to the primary ground.

The Zener diode 23 is positive-biased by a leading edge of the input voltage Vin, and the reset current generated by the leading edge of the input voltage Vin flows through the capacitor 24 and the resistor 25. When the reset current IR is higher than the on-bias current IB, the gate-source voltage of the damper switch 22 is decreased so that the damper switch 22 is turned off.

The reset current IR starts to decrease after the leading edge of the input voltage Vin, and when the reset current IR is lower than the on-bias current IB, a current is supplied to the gate of the damper switch 22 so that the gate-source voltage of the damper switch 22 is increased and thus the damper switch 22 is turned on.

The Zener diode 23 prevents the damper switch 22 from being damaged by clamping the gate-source voltage of the damper switch 22 to a Zener voltage. When a level of the voltage of the node N1 is not a level that damages the damper switch 22, a diode may be used instead of the Zener diode 23.

The resistor 25 operates as a damping resistor when the capacitor 24 is charged by the reset current IR. In addition, when no resistor 25 is provided, a switch current Isw flowing to the primary ground can influence the capacitor 24 that is directly connected to the primary ground. A connection relationship between the capacitor 24 and the resistor 25 is not limited to FIG. 1, and any connection relationship that can make the resistor 25 operate the damping resistor with respect to a voltage charged in the capacitor 24 is applicable. For example, locations of the capacitor 24 and the resistor 25 can be switched.

The resistor 1, the capacitor 3, and the diode D1 may operate with a snubber circuit of the power supply according to the exemplary embodiment of the invention. The exemplary embodiment of the invention is not limited to the flyback converter. The active damper according to the exemplary embodiment of the invention can be applied to various topologies.

Figure 2:
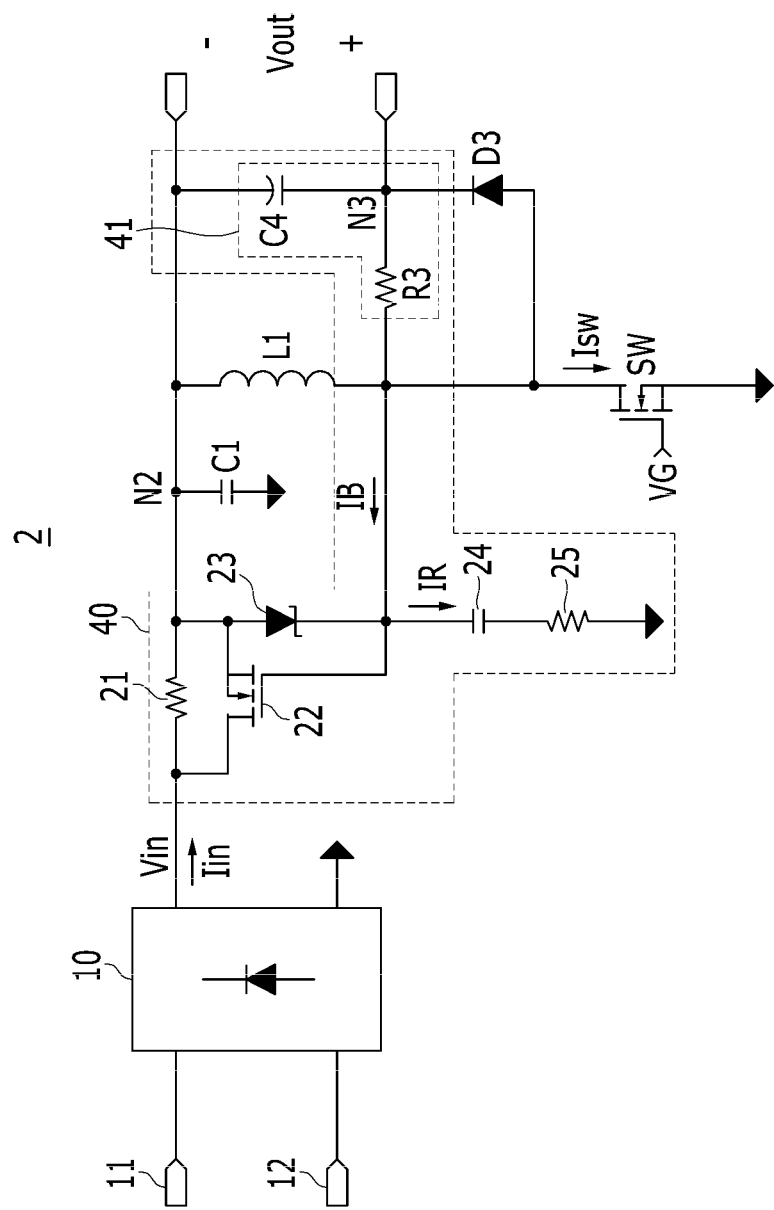
FIG. 2 shows a power supply including an active damper according to another exemplary embodiment.

FIG. 2 shows a power supply including an active damper according to another exemplary embodiment.

The same reference numerals designate the same elements in the previous exemplary embodiment, and a detailed description thereof will be omitted hereinafter. A power supply 2 according to the present exemplary embodiment is realized as a buck-boost converter.

The power supply 2 includes a rectification circuit 10, an active damper 40, a filter capacitor C1, a diode D3, an inductor L1, and a power switch SW.

The active damper 40 includes a damper resistor 21, a damper switch 22, a Zener diode 23, a capacitor 24, a resistor 25, and a turn-on circuit 41. When the damper switch 22 is turned on by a reset current IR generated by being synchronized with a leading edge of the input voltage Vin and the reset current IR is lower than an on-bias current IB, the damper switch 22 is turned on. The active damper 40 operates as a resistor during a turn-off period of the damper switch 22. During a turn-on period of the damper switch 22, the input voltage Vin and the filter capacitor C1 are directly connected with each other.

The damper resistor 21 is connected between the input voltage Vin and a node N2, a drain of the damper switch 22 is connected to the input voltage Vin, and a source of the damper switch 22 is connected to the node N2. The Zener diode 23, the capacitor 24, and the resistor 25 are the same as those in the previous exemplary embodiment, and therefore no further description will be provided.

The inductor L1 is connected between node N2 and a first end (i.e., a drain) of the power switch SW. The output capacitor C4 is connected between the node N2 and a node N3, a cathode of the diode D3 is connected to the node N3, and an anode of the diode D3 is connected to a first end of the power switch SW.

A current that depends on the input voltage Vin flows to the inductor L1 during a turn-on period of the power switch SW, and energy is stored in the inductor L1. During a turn-off period of the power switch SW, the current flowing to the inductor L1 flows through the diode D3 and the capacitor C4.

The turn-on circuit 41 supplies an on-bias current IB using an output voltage Vout, and includes an output capacitor C4 and a resistor R3. The output capacitor C4 is connected between lateral output ends of the power supply 2, a voltage between the lateral ends of the output capacitor C4 is the output voltage Vout, and a voltage of the node N2 depends on the output voltage Vout.

For example, when the power switch SW is in the turn-on state, a voltage of the node N3 is the output voltage Vout, and when the power switch SW is in the turn-off state, the voltage of the node N3 equals the sum of the output voltage Vout and the input voltage Vin. The voltage of the node N3 is high enough to supply the on-bias current IB.

The Zener diode 23 is positive-biased by a leading edge of the input voltage Vin, and a reset current generated by the leading edge of the input voltage Vin flows through the capacitor 24 and the resistor 25. When the reset current IR is higher than the on-bias IB, a gate-source voltage of the damper switch 22 is decreased so that the damper switch 22 is turned off.

The reset current IR starts to decrease after the leading edge of the input voltage Vin, and when the reset current IR is lower than the on-bias current IB, a current is supplied to the gate of the damper switch 22 so that a gate-source voltage of the damper switch 22 is increased and the damper switch 22 is turned on.

In the exemplary embodiment of FIG. 2, the active damper 40 includes the Zener diode 23, but a diode may be used instead of the Zener diode 23 unless a voltage of the node N2 has a level that damages the damper switch 22.

In the two previous exemplary embodiments, the damper switch 22 is realized as a metal oxide semiconductor field effect transistor (MOSFET), but the exemplary embodiments of the invention are not limited thereto. Instead of the MOSFET, a bipolar junction transistor (BJT) may be used.

Figure 3:
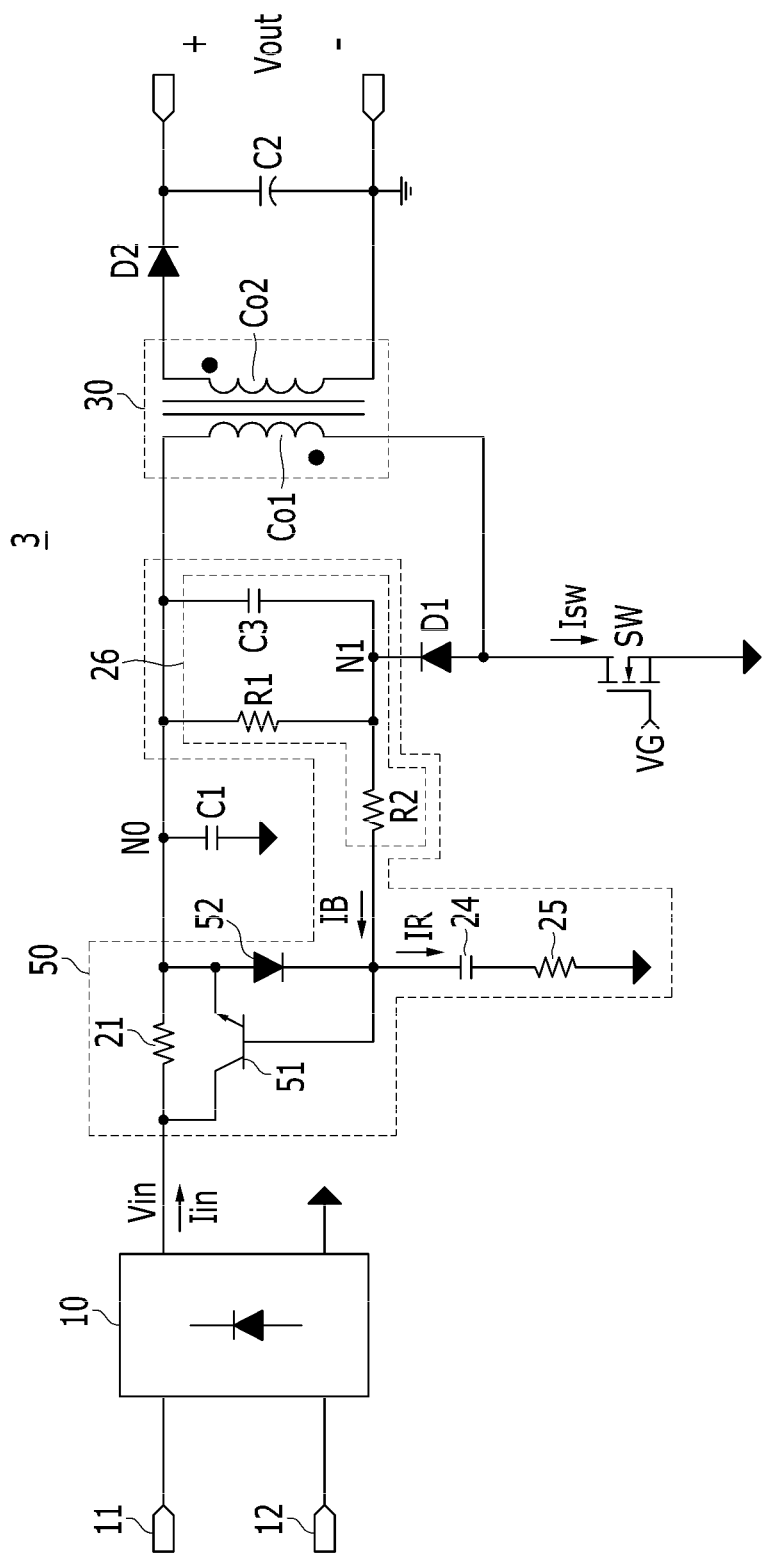
FIG. 3 shows a power supply according to a power supply including an active damper according to another exemplary embodiment.

FIG. 3 shows a power supply including an active damper according to another exemplary embodiment.

The same reference numerals designate the same elements in the previous exemplary embodiment, and a detailed description thereof will be omitted hereinafter. A power supply 3 according to the present exemplary embodiment is realized as a flyback converter.

The power supply 3 includes a rectification circuit 10, an active damper 50, a transformer 30, a filter capacitor C1, a diode D1, an output capacitor C2, a power switch SW, and a rectification diode D2.

As shown in FIG. 3, the active damper 50 includes a damper resistor 21, a damper switch 51, a diode 52, a capacitor 24, a resistor 25, and a turn-on circuit 26.

The damper resistor 21 and the damper switch 51 are connected in parallel with each other. A control end (hereinafter, a base) of the damper switch 51 is connected to a cathode of the diode 52, a first electrode of the capacitor 24, and a first end of a resistor 26, a collector of the damper switch 51 is connected to an input voltage Vin, and an emitter of the damper switch 51 is connected to a node N0.

An anode of the diode 52 is connected to the node N0, and a cathode of the diode 52 is connected to the base of the damper switch 51, the first electrode of the capacitor 24, and a first end of a resistor R2.

The damper switch 51 is turned off by a reset current IR that is generated by being synchronized with a leading edge of the input voltage Vin, and when the reset current IR is lower than an on-bias current IB, the damper switch 51 is turned on. The active damper 50 operates as a resistor during a turn-off period of the damper switch 51. During a turn-on period of the damper switch 51, the input voltage Vin and the filter capacitor C1 are directly connected.

The diode 52 is turned on by the leading edge of the input voltage Vin, and the reset current IR generated by the leading edge of the input voltage Vin flows through the capacitor 24 and the resistor 25. When the reset current IR is higher than the on-bias current IB, no current flows to the base of the damper switch 51 so that the damper switch 51 is turned off.

The reset current IR starts to decrease after the leading edge of the input voltage Vin, and when the reset current IR is lower than the on-bias current IB, a current is supplied to the base of the damper switch 51 so that the damper switch 51 is turned on. In this case, a voltage between the base and the emitter of the damper switch 51 is maintained with a threshold voltage (e.g., 0.7 V) of the damper switch 51. Thus, the diode 52 may be used to prevent the damper switch 22 from being damaged instead of using the Zener diode used as a clamping means for prevention of damage to the damper switch in the previous exemplary embodiment.

In the previous exemplary embodiment, an additional capacitor charged by the reset current generated by the leading edge of the input voltage Vin is included. However, the exemplary embodiment of the invention is not limited thereto, and a bleeder capacitor provided in the power supply may be used.

Figure 4:
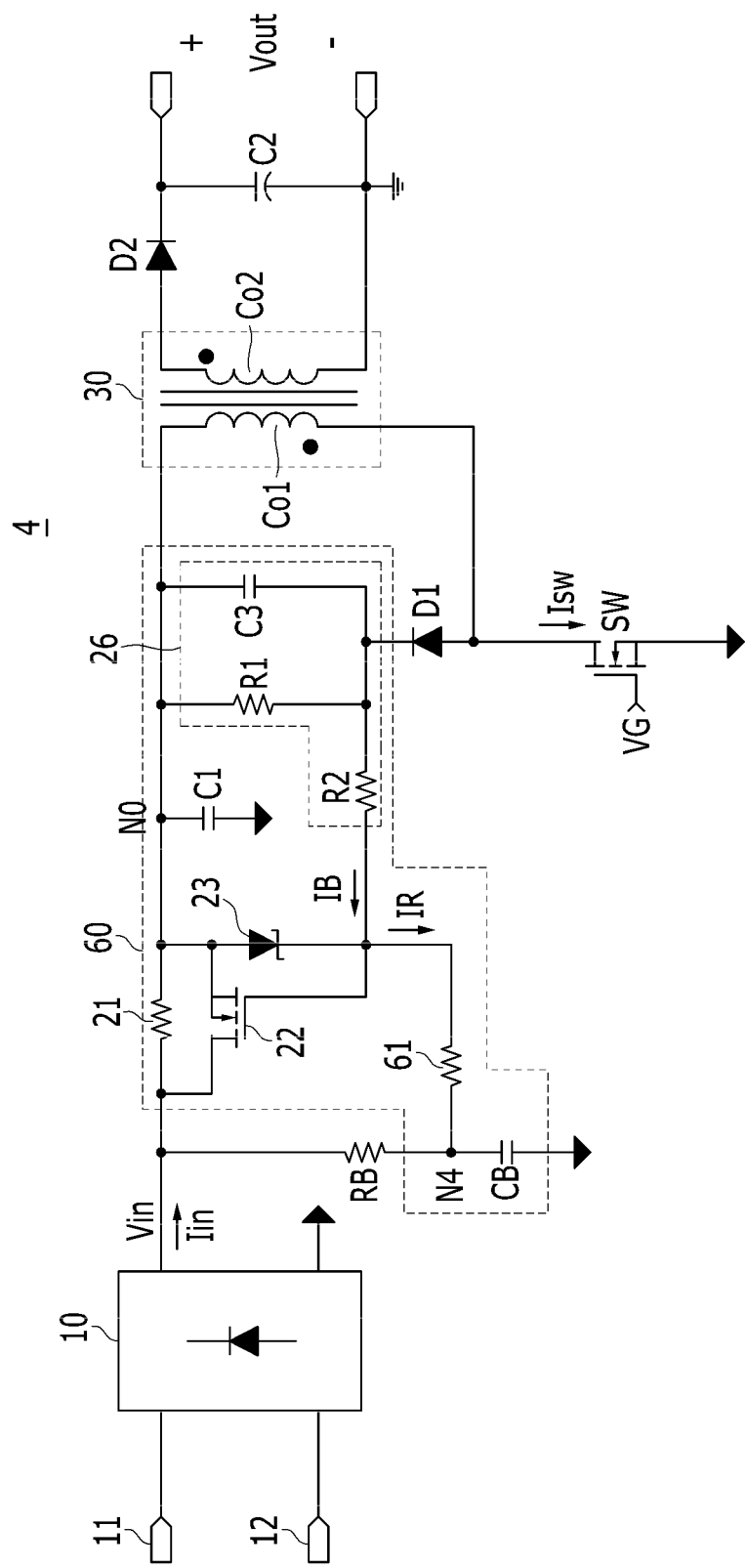
FIG. 4 shows a power supply according to another exemplary embodiment.

FIG. 4 shows a power supply according to another exemplary embodiment.

The same reference numerals designate the same elements in the previous exemplary embodiment, and a detailed description thereof will be omitted hereinafter. A power supply 4 according to the present exemplary embodiment is realized as a flyback converter.

As shown in FIG. 4, the power supply 4 includes a rectification circuit 10, an active damper 60, a transformer 30, a filter capacitor C1, a diode D1, an output capacitor C2, a power switch SW, and a rectification diode D2.

The active damper 60 includes a damper resistor 21, a damper switch 22, a Zener diode 23, a bleeder capacitor CB, a resistor 61, and a turn-on circuit 26.

A bleeder resistor RB and the bleeder capacitor CB form a passive bleeder, and maintain an input current of the power supply 4 to be higher than a predetermined holding current so as to prevent a dimmer from being turned off.

The bleeder resistor RB and the bleeder capacitor CB are connected in series between the input voltage Vin and a primary ground. A first end of the resistor 61 is connected to a node N4 where the bleeder resistor RB and the bleeder capacitor CB are connected, and a second end of the resistor 61 is connected to a gate of the damper switch 22, a cathode of the Zener diode 23, and a first end of the resistor R2. The resistor 61 is a damper resistor.

The damper switch 51 is turned off by a reset current IR that is generated by being synchronized with a leading edge of the input voltage Vin, and when the reset current IR is lower than an on-bias current IB, the damper switch 22 is turned on. The active damper 60 operates as a resistor during a turn-off period of the damper switch 22. During a turn-on period of the damper switch 22, the input voltage Vin and the filter capacitor C1 are directly connected.

The Zener diode 23 is positive-biased by a leading edge of the input voltage Vin, and the reset current generated by the leading edge of the input voltage Vin flows through the resistor 61 and the bleeder capacitor CB. When the reset current IR is higher than the on-bias current IB, the gate-source voltage of the damper switch 22 is decreased so that the damper switch 22 is turned off.

The reset current IR starts to decrease after the leading edge of the input voltage Vin, and when the reset current IR is lower than the on-bias current IB, a current is supplied to the gate of the damper switch 22 so that the gate-source voltage of the damper switch 22 is increased and thus the damper switch 22 is turned on.

Hereinafter, operation of the active damper will be described with reference to FIG. 5 and FIG. 6.

Figure 5:
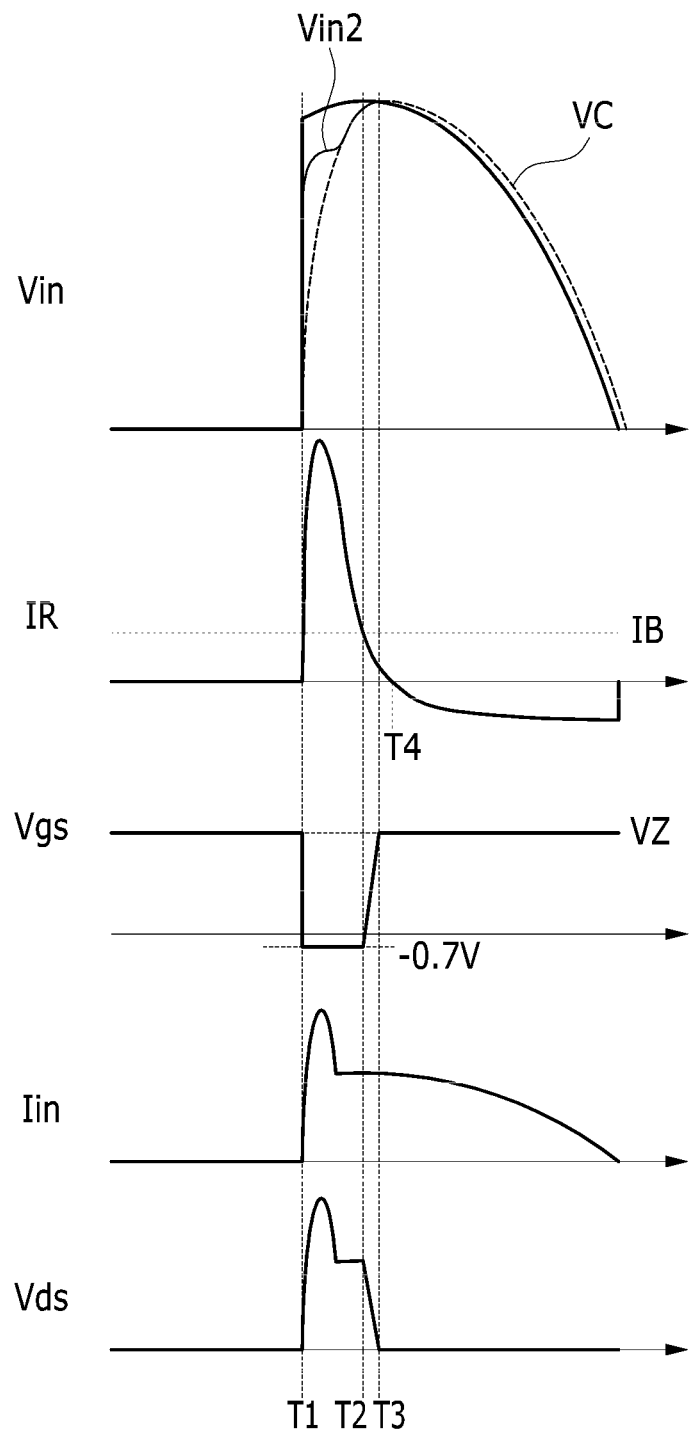
FIG. 5 is a waveform diagram of an input voltage, a second input voltage, a charge voltage, a reset current, a gate-source voltage and a drain-source voltage of a damper switch, and an input current in the power supply of FIG. 1.

FIG. 5 is a waveform diagram of an input voltage, a second input voltage, a charge voltage, a reset current, a gate-source voltage and a drain-source voltage of the damper switch, and an input current in the power supply of FIG. 1.

The waveform diagram shown in FIG. 5 is not limited to the exemplary embodiment of FIG. 1, and is generated in other exemplary embodiments. A charge voltage VC is a voltage generated from a first electrode of the capacitor 24. The second input voltage Vin2 is an input voltage Vin passed through the active damper 20. For example, the second input voltage Vin2 is a voltage of the node N0 and the node N2.

At T1, the input voltage Vin is rapidly increased so that a leading edge is generated, and the reset current IR is rapidly increased by the leading edge of the input voltage Vin. At T1, the reset current IR becomes higher than the on-bias current IB.

The capacitor 24 is charged by the reset current IR, and a gate-source voltage Vgs of the damper switch 22 is reset to a low-level voltage (e.g., −0.7 V) and thus turned off. In this case, a current acquired by subtracting the on-bias current IB from the reset current IR flows to the Zener diode 23, and the gate-source voltage Vgs is determined according to a voltage between lateral ends of the Zener diode 23. Since the damper resistor 21 is provided between the input voltage Vin and a second input voltage Vin2 by the turn-off of the damper switch 22, the second input voltage Vin2 is increased slower than the input voltage Vin.

From T1, the drain-source voltage Vds of the damper switch 22 is increased according to the leading edge and then decreased by the damper resistor 21, and then maintained in a constant level.

During a turn-on period T2 to T3 of the damper switch 22, the drain-source voltage Vds is decreased and then becomes zero at T3 at which the damper switch 22 is completely turned on. The input current Iin is increased according to the leading edge and then decreased by the damper resistor 21 at T1, and then decreased along with a decrease of the input voltage Vin.

The charge voltage VC is increased slower than the second input voltage Vin2 by the resistor 25, which is a damper resistor. As the charge voltage VC becomes closer to the second input voltage Vin2, the reset current IR is decreased.

The decreasing reset current IR becomes lower than the on-bias current IB at T2. From T2, the gate-source voltage Vgs is charged by the on-bias current IB, the damper switch 22 is slowly turned on, and the second input voltage Vin2 becomes close to the input voltage Vin. Since the damper switch 22 is turned on, the drain-source voltage Vds becomes zero.

At T3, the damper switch 22 is completely turned on by the on-bias current IB, and the input voltage Vin and the second input voltage Vin2 become equivalent to each other. Since a voltage drop occurs due to the resistor 25, the charge voltage VC is higher than the input voltage Vin and the second input voltage Vin2.

After T3, the gate-source voltage Vgs is clamped to a Zener voltage VZ of the Zener diode 23 in the exemplary embodiment of FIG. 1. In the exemplary embodiment of FIG. 3, the damper switch 51 is turned on by the on-bias current IB after T2, and the base-emitter voltage is maintained with 0.7 V.

From T4, the reset current IR flows in a direction (i.e., a negative direction) that discharges the capacitor 24.

As shown in FIG. 5, the reset current IR turns off the damper switch 22 from T1 to T2, and such a turn-off period is based on an RC delay that is determined according to the capacitor 24 and the resistor 25. In the exemplary embodiment shown in FIG. 4, the turn-off period of the damper switch 22 is determined based on an RC delay determined according to the bleeder capacitor CB and the resistor 61.

Figure 6:
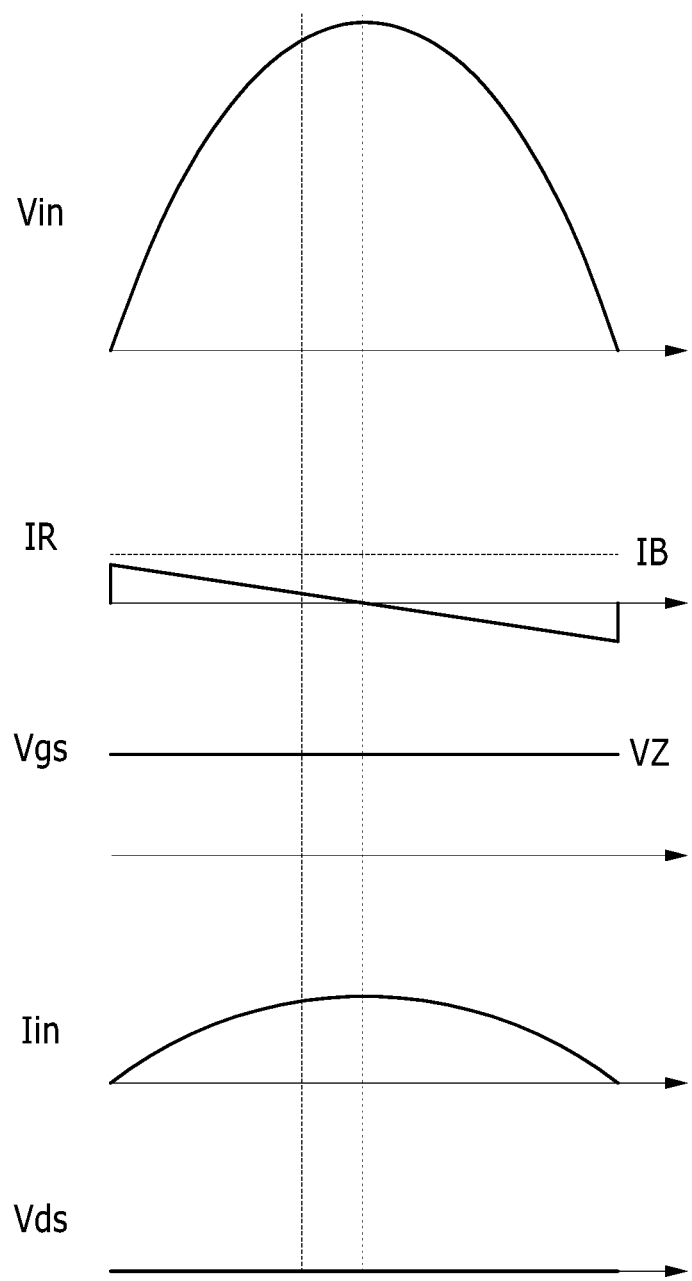
FIG. 6 is a waveform diagram of an input voltage, a reset current, a gate-source voltage and a drain-source voltage of a damper switch, and an input current in a case that a dimmer is not provided.

FIG. 6 is a waveform diagram illustrating an input voltage, a reset current, a gate-source voltage and a drain-source voltage of the damper switch, and an input current in a case that a dimmer is not provided.

The case that the dimmer is not provided includes a case that dimming is not generated although a dimmer is provided so that a leading edge of the input voltage is not generated.

As shown in FIG. 6, the input voltage Vin is increased and decreased with a sine wave, and the reset current IR is changed according to the input voltage Vin but is lower than the on-bias current IB. Thus, the gate-source voltage of the damper switch 22 is maintained with a predetermined voltage VZ rather than being reset. The input current Iin is increased and decreased according to the input voltage Vin, and the drain-source voltage of the damper switch 22 is always zero by turn-on of the damper switch 22.

As in the exemplary embodiments, switching operation of the damper switch is controlled by a capacitor charged by the reset current so that the active damper operates as a resistor only in a period during which a spike current is generated by the leading edge of the input voltage.

When the input voltage is a trailing edge, a damper resistor is operated even in a case that an input voltage is increased from zero, thereby causing unnecessary power consumption in a conventional art. The active damper according to the exemplary embodiments only operates in the leading edge of the input voltage, thereby preventing unnecessary power consumption, and a spike current due to the leading edge can be prevented.

Hereinafter, an active damper that controls switching of a damper switch using a capacitor provided for detection of an inductor voltage without using an additional capacitor, and a power supply including the same according to another exemplary embodiment of the invention will be described.

Figure 7:
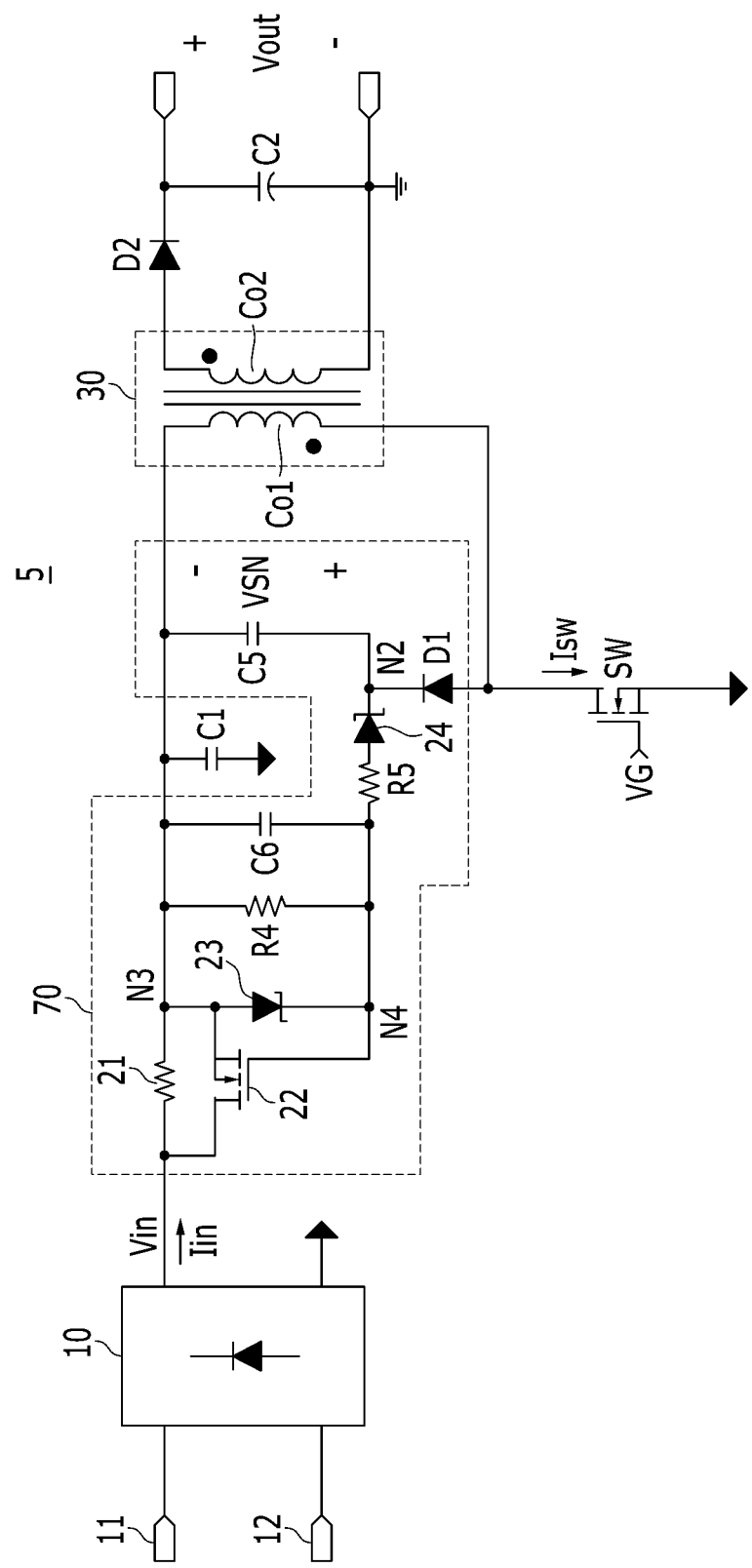
FIG. 7 shows an active damper and a power supply including the same according to another exemplary embodiment of the invention.

FIG. 7 shows an active damper and a power supply including the same according to the other exemplary embodiment of the invention.

A power supply 5 shown in FIG. 7 is realized as a flyback converter, but the present exemplary embodiment is not limited thereto. The same reference numerals designate the same elements in the previous exemplary embodiment, and a detailed description thereof will be omitted hereinafter.

A gate of a damper switch 22 is connected to a node N4, and the node N4 is connected with a first end of a resistor R4, a first electrode of a capacitor C6, and a first end of a resistor R5.

A second end of the resistor R4 and a second electrode of the capacitor C6 are connected with a resistor R21 in a node N3, and a filter capacitor C1 is connected between the node N3 and a primary ground.

A capacitor C5 is connected between the node N3 and a node N2 and a cathode of a diode D1 is connected to the node N2. A Zener diode 24 is connected between a second end of the resistor R5 and the node N2. A cathode of the Zener diode 24 is connected to the node N2 and an anode of the Zener diode 24 is connected to an anode of the resistor R5. A voltage between the node N2 and the node N3 is referred to as a detection voltage VSN.

In the present exemplary embodiment, the detection voltage VSN is controlled by the resistors R4 and R5, the Zener diode 24, and the capacitor C6 and thus converted to a voltage of the node N4, that is, a gate voltage of the damper switch 22. The resistors R4 and R5, the Zener diode 24, and the capacitor C6 may form a switch control circuit that controls a switching operation of the damper switch 22.

The capacitor C5, the diode D1, and the resistor R5 may form an inductor voltage detection circuit that detects an inductor voltage (primary wire Co1 in FIG. 1).

When a power switch SW is turned off, energy of leakage inductance in the primary wire Co1 is transmitted to the capacitor C5 through the diode D1 and thus a voltage of an inductor becomes equivalent to the detection voltage VSN. That is, the detection voltage VSN based on the inductor voltage is generated.

The diode D1 is turned on by the inductor voltage, and the capacitor C5 filters the detection voltage VSN. The detection voltage VSN is controlled through the Zener diode 24, the resistor C6, and the resistor R4 and then transmitted to the node N4. A desired time constant can be acquired by appropriately controlling the size of each of the resistor R5, the capacitor C6, and the resistor R4.

A Zener diode 23 is connected between the node N3 and the node N4 and clamps a gate-source voltage of the damper switch 22 to a Zener voltage when the gate-source voltage is higher than the Zener voltage.

The capacitor C5 and the diode D1 may operate as a snubber circuit of the power supply. For example, the inductor voltage is transmitted to the snubber circuit through the diode D1, and the snubber circuit may determine the inductor voltage.

Figure 8:
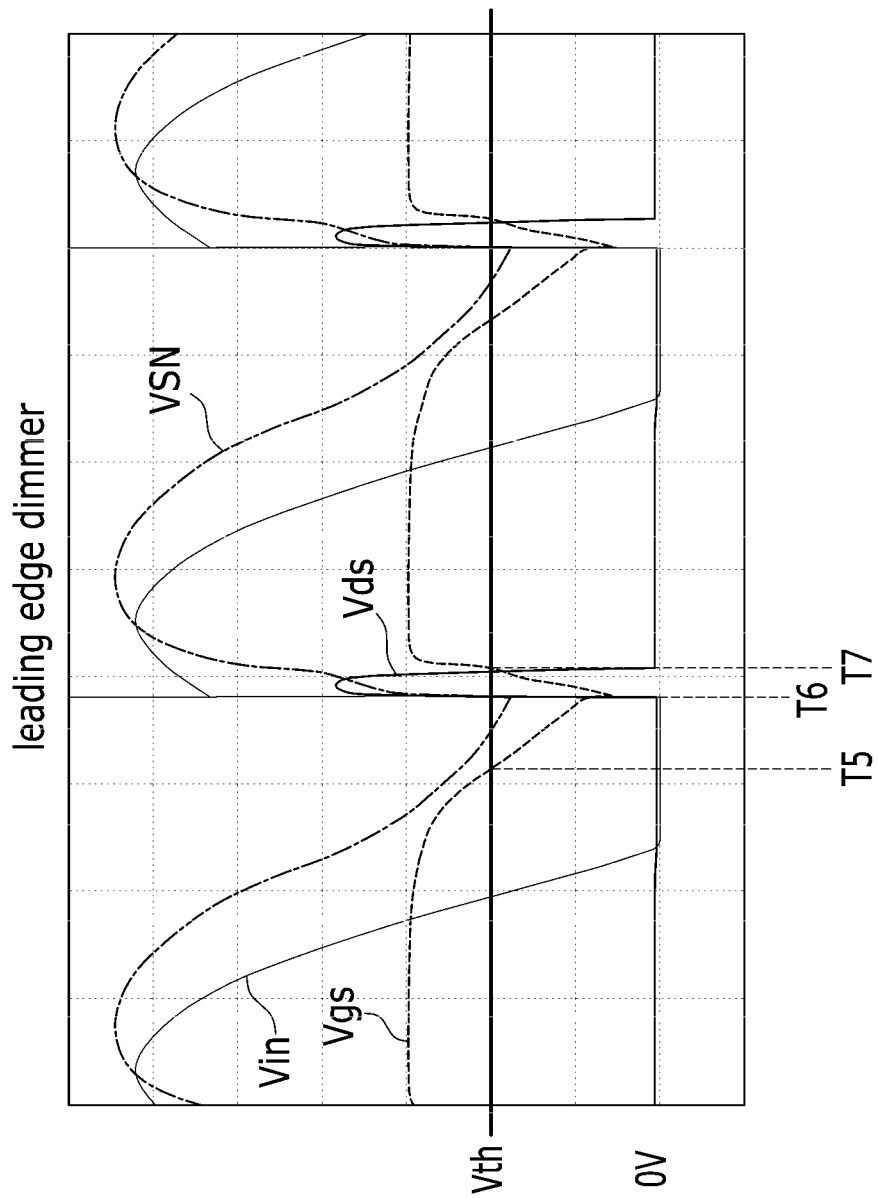
FIG. 8 is a waveform diagram of a detection voltage, an input voltage, a gate-source voltage of a damper switch, and a drain-source voltage of the damper switch according to the other exemplary embodiment of the invention.

FIG. 8 shows a detection voltage, an input voltage, a gate-source voltage of the damper switch, and a drain-source voltage of the damper switch according to the present exemplary embodiment.

Figure 9:
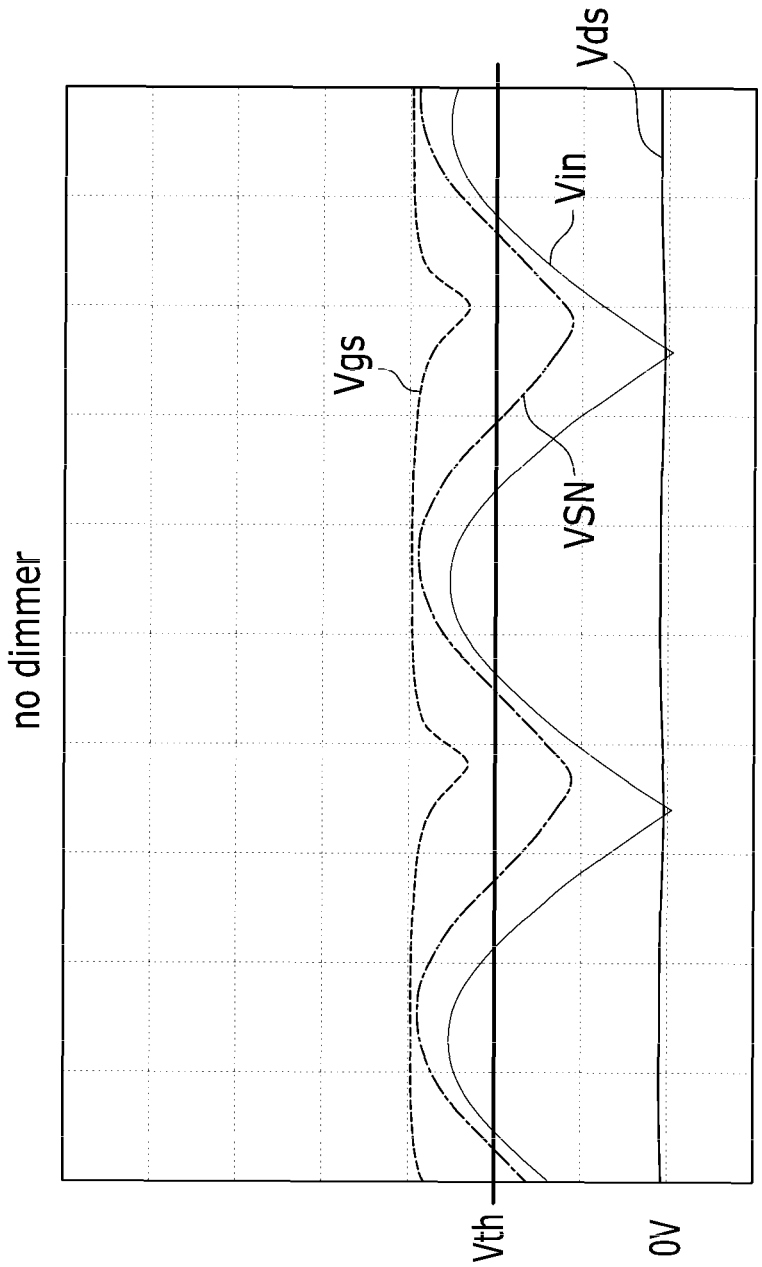
FIG. 9 is a waveform diagram of a detection voltage, an input voltage, a gatesource voltage of the damper switch, and a drain-source voltage of the damper switch when no dimmer is provided according to the other exemplary embodiment of the invention.

In FIG. 8 and FIG. 9, the detection voltage VSN is denoted as a long and short dash line, a gate-source voltage Vgs of the damper switch is denoted as a dotted line, and a drain source voltage Vds of the damper switch is denoted as a solid line for distinguishing each waveform.

As shown in FIG. 8, the detection voltage VSN is fluctuated according to the input voltage Vin, and the gate-source voltage Vgs is fluctuated according to the detection voltage VSN.

In FIG. 8, the input voltage Vin, the detection voltage VSN, and the drain-source voltage are illustrated with a scale of every 20V, and the gate-source voltage Vgs is illustrated with a scale of every 2V.

When the detection voltage VSN is decreased as the input voltage Vin is decreased, the gate-source voltage Vgs is decreased, and when the gate-source voltage Vgs is lower than a threshold voltage Vth of the damper switch 22 at T5, the damper switch 22 is turned off. In this case, no input voltage Vin is generated and therefore the drain-source voltage Vds is maintained with zero voltage.

A peak of the drain-source voltage Vds is generated by a leading edge of the input voltage Vin at T6. The detection voltage VSN is increased after T6, and the gate-source voltage Vgs is also increased.

When the increasing gate-source voltage Vgs becomes higher than the threshold voltage Vth at T7, the damper switch 22 is turned on. When the damper switch 22 is turned on, the drain-source voltage Vds becomes zero voltage.

FIG. 9 shows a detection voltage, an input voltage, a gate-source voltage of the damper switch, and a drain-source voltage of the damper switch when no dimmer is provided according to the present exemplary embodiment.

As shown in FIG. 9, the detection voltage VSN is decreased along a sine wave and the gate-source voltage Vgs is decreased along the detection voltage VSN near zero voltage of the input voltage Vin.

The gate-source voltage Vgs is always maintained higher than the threshold voltage Vth and thus the damper switch 22 is always in the turn-on state, and therefore the drain-source voltage Vds is maintained with zero voltage. Since the input voltage Vin is not passed through the damper resistor 21, the damper resistor 21 does not consume power and accordingly efficiency can be improved.

Figure 10:
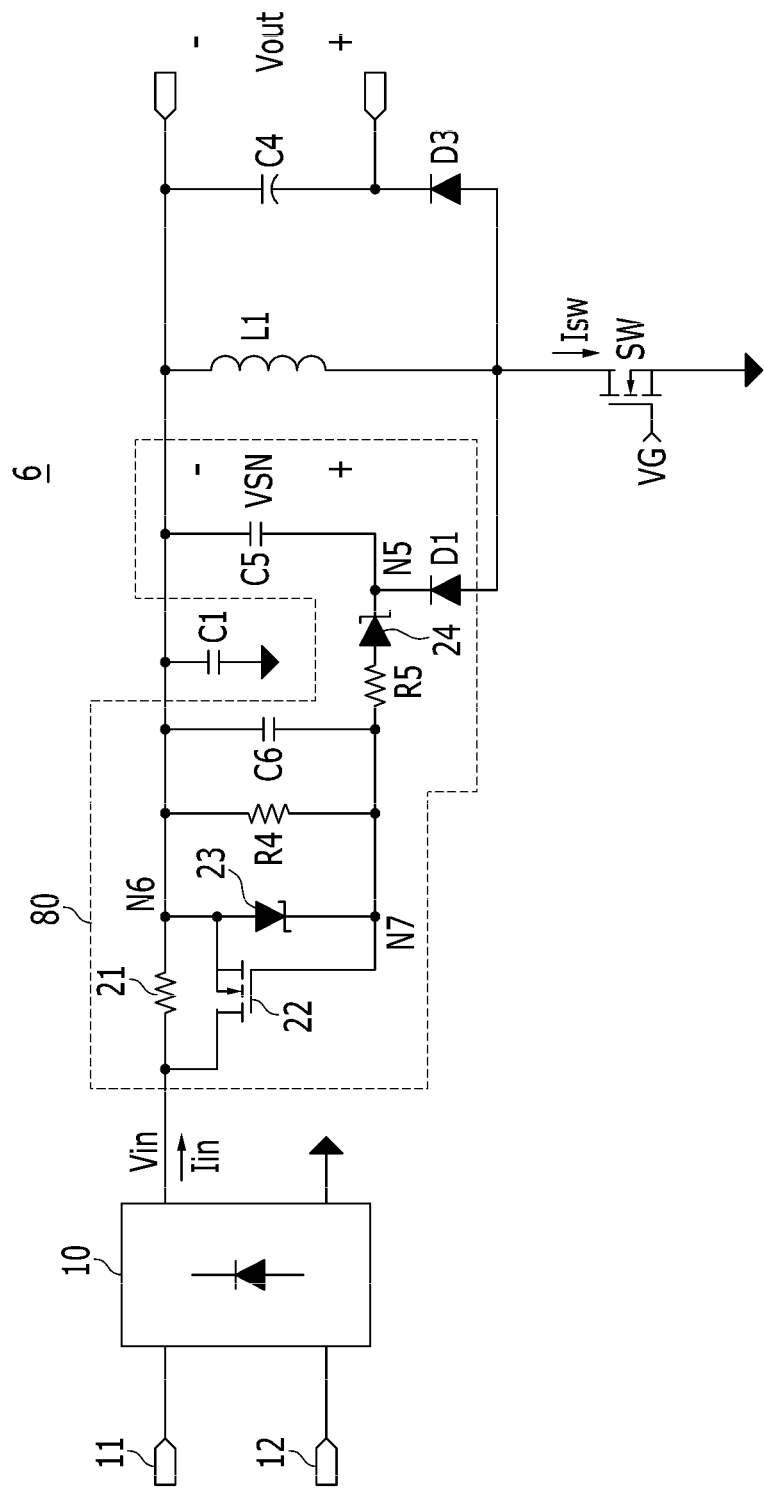
FIG. 10 shows a power supply including an active damper according to another exemplary embodiment of the invention.

FIG. 10 shows a power supply including an active damper according to another exemplary embodiment of the invention.

The same reference numerals designate the same elements in the previous exemplary embodiment, and a detailed description thereof will be omitted hereinafter. A power supply 6 according to the present exemplary embodiment is realized as a buck-boost converter.

As shown in FIG. 10, an active damper 80 is the same as the active damper 70, and the active damper 80 can be applied to the buck-boost converter.

A first end of an inductor L1 is connected to a node N6 and a second end of the inductor L1 is connected to a drain of a power switch SW. An anode of a diode D1 is connected to the drain of the power switch SW and a cathode of the diode D1 is connected to a node N5. A capacitor C5 is connected between the node N6 and the node N5. The diode D1 is turned on by an inductor voltage of a turn-off period of the power switch SW, and a detection voltage VSN is filtered by the capacitor C5. The resistor R5 is connected between the node N5 and a node N7, and a first end of the resistor R4 and a first electrode of a capacitor C6 are connected to the node N7. A second end of the resistor R4 and a second electrode of the capacitor C6 are connected to the node N6. The active damper 80 operates as previously described with reference to FIG. 8 and FIG. 9, and therefore no further description will be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS power supply 1, 2, 3, 4
rectification circuit 10
active damper 20, 40, 50, 60
transformer 30
power switch SW
damper switch 22, 51
turn-on circuit 26, 41
filter capacitor C1
output capacitor C2
capacitor 24
capacitor C3
bleeder capacitor CB
rectification diode D2
Zener diode 23
diode D1
diode 52
resistor R1
damper resistor 21
resistor 25, R2, R3
bleeder resistor RB
inductor L1

What is claimed is:

1. An active damper, comprising:
a damper resistor coupled to an input voltage;
a damper switch coupled in parallel with the damper resistor;
a capacitor configured to receive a reset current generated by a leading edge of the input voltage, wherein the damper switch is turned off by the reset current; and
a turn-on circuit configured to supply an on-bias current to a node where a first electrode of the capacitor and a control end of the damper switch are coupled, wherein the damper switch is turned off when the reset current is higher than the on-bias current.

2. The active damper of claim 1, wherein a charge voltage of the capacitor follows the input voltage.

3. The active damper of claim 1, further comprising a Zener diode coupled between the damper resistor and a gate of the damper switch, wherein the reset current flows to the capacitor through the Zener diode.

4. The active damper of claim 1, further comprising a diode coupled between the damper resistor and a gate of the damper switch, wherein the reset current flows to the capacitor through the diode.

5. The active damper of claim 1, wherein the damper switch is a metal oxide semiconductor field effect transistor (MOSFET); and
a first electrode of the capacitor is coupled to a gate of the damper switch.

6. The active damper of claim 1, wherein the damper switch is a bipolar junction transistor (BJT); and
a first electrode of the capacitor is coupled to a base of the damper switch.

7. The active damper of claim 1, further comprising a resistor coupled to the capacitor, wherein the resistor operates as a damping resistor when the capacitor is charged by the reset current.

8. The active damper of claim 7, wherein a first electrode of the capacitor is coupled to a control end of the damper switch, and the resistor is coupled to a second electrode of the capacitor.

9. The active damper of claim 7, wherein a time at which the damper switch is turned off by the leading edge and a time at which the damper switch is turned on are determined by the capacitor and the resistor.

10. A power supply, comprising:
a power switch; and
an active damper coupled to an input voltage and the power switch so as to provide the input voltage to the power switch, wherein the active damper comprises:
a damper resistor coupled to the input voltage;
a damper switch coupled in parallel with the damper resistor;
a capacitor configured to receive a reset current generated by a leading edge of the input voltage, wherein the damper switch is turned off by the reset current; and
a turn-on circuit configured to supply an on-bias current to a node where a first electrode of the capacitor and a control end of the damper switch are coupled, wherein the damper switch is turned off when the reset current is higher than the on-bias current.

11. The power supply of claim 10, wherein the turn-on circuit comprises:
a first resistor including a first end coupled to a transformer of the power supply;
a first capacitor including a first electrode coupled to the transformer; and
a second resistor including a first end coupled to a second end of the first resistor and a second electrode of the first capacitor, and a second end coupled to the control end of the damper switch.

12. The power supply of claim 10, wherein the power supply further comprises a bleeder resistor and a bleeder capacitor coupled between the input voltage and a ground.

13. The power supply of claim 12, wherein the active damper further comprises a third resistor coupled between a first electrode of the bleeder capacitor and a control end of the damper switch, and the third resistor operates as a damping resistor when the bleeder capacitor is charged by the reset current.

14. The power supply of claim 10, wherein a charge voltage of the capacitor follows the input voltage.

15. The power supply of claim 10, wherein the active damper further comprises a Zener diode coupled between the damper resistor and a gate of the damper switch, wherein the reset current flows to the capacitor through the Zener diode.

16. The power supply of claim 10, wherein the active damper further comprises a diode coupled between the damper resistor and a gate of the damper switch, wherein the reset current flows to the capacitor through the diode.

17. An active damper comprising:
a damper resistor coupled to an input voltage;
a damper switch coupled in parallel with the damper resistor;
a detection circuit configured to detect a voltage of an inductor coupled to a first input voltage through the damper resistor or the damper switch, the detection circuitry including:
a diode including an anode coupled to a first end of the inductor; and
a first capacitor coupled between a cathode of the diode and the first input voltage, wherein the detection voltage is a voltage between a first node to which the cathode of the diode and the first capacitor are coupled and a second end of the inductor; and a control circuit configured to control a switching operation of the damper switch using a detection voltage according to the detected inductor voltage.

18. The active damper of claim 17, further comprising:
a first resistor coupled between a control electrode of the damper switch and the first node; and
a second resistor coupled between the first input voltage and the first resistor.

19. The active damper of claim 18, further comprising a second capacitor coupled between a first end of the first resistor coupled to the control electrode of the damper switch and the first input voltage.

20. The active damper of claim 18, further comprising a Zener diode coupled between the first resistor and the first node.

21. The active damper of claim 18, further comprising a Zener diode coupled between the first resistor and the first input voltage.

22. A power supply comprising:
an inductor including a first end and a second end;
a power switch coupled to the second end of the inductor; and
an active damper coupled to an input voltage and the first end of the inductor so as to provide the input voltage to the inductor, wherein the active damper comprises:
a damper resistor coupled to the input voltage;
a damper switch coupled in parallel with the damper resistor;
a detection circuit configured to detect a voltage of the inductor, the detection circuit including:
a diode including an anode coupled to a second end of the inductor; and
a first capacitor coupled between a cathode of the diode and the input voltage, wherein the detection voltage is a voltage between a first node to which the cathode of the diode and the first capacitor are coupled and a first end of the inductor; and
a control circuit configured to control a switching operation of the damper switch using a detection voltage according to the detected inductor voltage.

23. The power supply of claim 22, wherein the active damper further comprises:
a first resistor coupled between a control electrode of the damper switch and the first node; and
a second resistor coupled between the first input voltage and the first resistor.

24. The power supply of claim 23, wherein the active damper further comprises a second capacitor coupled between a first end of the first resistor coupled to the control electrode of the damper switch and the first input voltage.

25. The power supply of claim 23, wherein the active damper further comprises a Zener diode coupled between the first resistor and the first node.

26. The power supply of claim 23, wherein the active damper further comprises a Zener diode coupled between the first resistor and the first input voltage.

27. The power supply of claim 22, wherein the detection circuit operates as a snubber circuit of the power supply.

28. The power supply of claim 27, wherein the snubber circuit determines the inductor voltage.

* * * * *